No. 625,368. Patented May 23, 1899.
G. L. THOMPSON.
BICYCLE STEP.
(Application filed Jan. 3, 1898.)

(No Model.)

Witnesses:
Edmund A. Strauss
Harold G. Barrett

Inventor
George L. Thompson,
by Poole & Brown his Attys.

UNITED STATES PATENT OFFICE.

GEORGE L. THOMPSON, OF CHICAGO, ILLINOIS.

BICYCLE-STEP.

SPECIFICATION forming part of Letters Patent No. 625,368, dated May 23, 1899.

Application filed January 3, 1898. Serial No. 665,345. (No model.)

*To all whom it may concern:*

Be it known that I, GEORGE L. THOMPSON, of Chicago, in the county of Cook and State of Illinois, have invented certain new and useful Improvements in Bicycle-Steps; and I do hereby declare that the following is a full, clear, and exact description thereof, reference being had to the accompanying drawings, and to the letters of reference marked thereon, which form a part of this specification.

This invention relates to improvements in bicycles and other vehicles and refers more specifically to an improved step which is attached to and projects from the axle of the machine and serves to aid the rider in mounting.

The invention consists in the matters hereinafter set forth, and more particularly pointed out in the appended claims.

Figure 1:
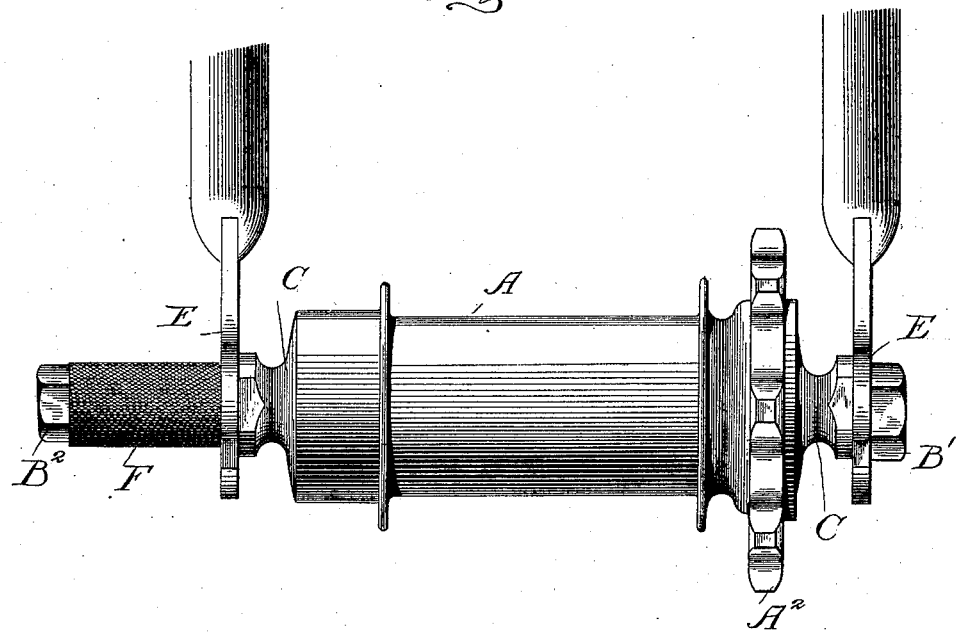
Figure 2:
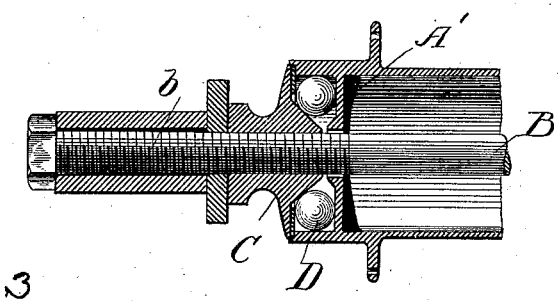
Figure 3:
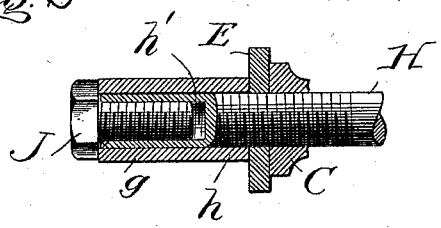

In the drawings, Figure 1 illustrates in rear elevation the rear hub of a bicycle provided with my invention. Fig. 2 is a longitudinal sectional view of the end thereof to which the step is affixed. Fig. 3 is a detail longitudinal sectional view showing a modified form of the step.

First referring to Figs. 1 and 2, A designates the hub of a bicycle, provided with the usual sprocket-wheel $A^2$, and B an axle which is secured rigidly in the frame and on which the hub turns in the usual manner. C designates the inner bearing rings or cones, which have screw-threaded engagement with the outer axle, the members of the bearing being formed in the ends of the hub in the usual manner. Between said bearing members are interposed the usual antifriction-rollers D. E designates the junction-pieces of fittings to which the lower ends of the rear oblique and horizontal members of the machine-frame are attached and to which the ends of the axle B are rigidly secured or clamped. The fitting E on that side of the hub adjacent to the sprocket-pinion $A^2$ is clamped upon the axle between the adjacent bearing-ring C and a clamping-nut B'. The opposite end of the axle is extended some distance beyond the adjacent frame-fitting E and is provided outside of said frame member with a sleeve F, which is of slightly less length than the length of said axle outside of the machine-frame. In the construction shown in Figs. 1 and 2 the axle is made of uniform diameter throughout its length, and the end of the axle upon which the sleeve F is mounted is provided with a screw-threaded portion $b$ from the point adjacent the inner side of the bearing-ring C to the outer end of the axle to permit the bearing-ring C to be placed thereon. The sleeve F is of approximately the same interior diameter as the outer diameter of the extended portion of the axle and is adapted to be slipped over the same, but to fit closely thereon. Said sleeve is secured in place upon the axle by means of a clamping-nut $B^2$, which has screw-threaded engagement with the end portion of the axle outside of the sleeve. The said sleeve serves to transmit the clamping action of the nut $B^2$ to the frame-fitting, whereby said frame-fitting is clamped and held firmly between the shoulder formed by the bearing-ring C and the inner end of said sleeve. The outer surface of the sleeve F is knurled, as shown in Fig. 1, in order to prevent the foot of the rider from slipping from the same when mounting the machine. The nut $B^2$ when turned against the sleeve will firmly clamp the latter between the nut and the machine-frame, and thereby prevent the latter from turning upon the axle when the rider is mounting the machine.

The construction shown in Fig. 4 is designed for a machine or vehicle having a rear axle of greater diameter than those shown in the previously-described figures. In said figure, H designates one end of the axle on which the bearing-ring C is mounted and with which the frame-fitting E has engagement. Said axle is made of uniform diameter throughout its length and is provided with a screw-threaded portion $h$, which extends to the extreme outer end thereof. I designates a sleeve, similar to the sleeve F, which fits over the extended portion of the axle outside of the frame member E. Said axle is provided in its outer end with a screw-threaded axial bore $h'$, and the sleeve is secured in place upon the axle by means of a tap-bolt J, which has screw-threaded engagement with said axial bore and the head of which engages the outer end of the sleeve. In this construction it will be desirable that the end of the sleeve I which is to be engaged by the head of the bolt J shall project slightly beyond the outer end of the axle, so as to be engaged by the head of the bolt J in advance of the outer end of said axle.

The construction in bicycle-mounting steps in which the axle is extended beyond the machine-frame and is provided on such extended portion with an exterior sleeve which is clamped against the frame by means engaging the outer ends of the same is of practical value and importance, for the reason that it affords the greatest possible strength to the said step and insures against breaking of the same when the weight of the rider is brought thereon. Heretofore it has been common to provide the clamping-nut which engages the machine-frame with an integral outwardly-extending portion, which is exteriorly knurled and which serves as a mounting-step. This construction has been found to be objectionable owing to the fact that the strain due to the weight of the rider is thrown upon such extended portion of the nut in its part immediately adjacent to the screw-threaded portion thereof which engages the outer end of the axle, and breakage often occurs at this point. With my construction, on the other hand, the sleeve which forms the step is reinforced to the extreme outer end thereof by the extended portion of the axle, and as the sleeve is clamped rigidly between the machine-frame and the outer clamping means and the inner end of the sleeve has a considerable area of bearing-surface engaging the machine-frame said sleeve in turn reinforces the axle, so that the strength required to break the step would be much greater than that required to break the axle if the sleeve were not present.

Another main object gained by the use of my invention is that the parts may be more readily and economically manufactured than a step which consists of a clamp-nut and an integral outwardly-extending portion. Such last-mentioned part must be made by machine constructed especially for that purpose, while a step made in accordance with my invention, consisting only of a sleeve and simple nut, may be constructed in any well-equipped machine-shop and without the use of special tools or machinery. Moreover, the clamping means being located at the extreme outer end of the axle are much more accessible than when consisting of a nut which is located at the inner end of the step, as in the constructions heretofore used.

I claim as my invention—

1. The combination with a machine-frame, of an axle which extends outside of said frame and is provided with a shoulder for contact with the inner surface of the frame, a cylindric sleeve having a smooth interior surface adapted to be slipped over said extended portion of the axle, and bearing at its inner end against the outer surface of the machine-frame, and clamping means on the axle engaging the outer end of the sleeve.

2. The combination with a machine-frame, of an axle which extends outside of said frame and is provided with a shoulder for contact with the inner surface of the frame, a cylindric sleeve having a smooth interior surface adapted to be slipped over said extended portion of the axle and bearing at its inner end against the outer surface of the machine-frame, and a nut having screw-threaded engagement with the outer end of said extended portion of the axle and engaging the outer end of the said sleeve.

In testimony that I claim the foregoing as my invention I affix my signature, in presence of two witnesses, this 31st day of December, A. D. 1897.

GEORGE L. THOMPSON.

Witnesses:
C. CLARENCE POOLE,
WILLIAM L. HULL.